UNITED STATES PATENT OFFICE.

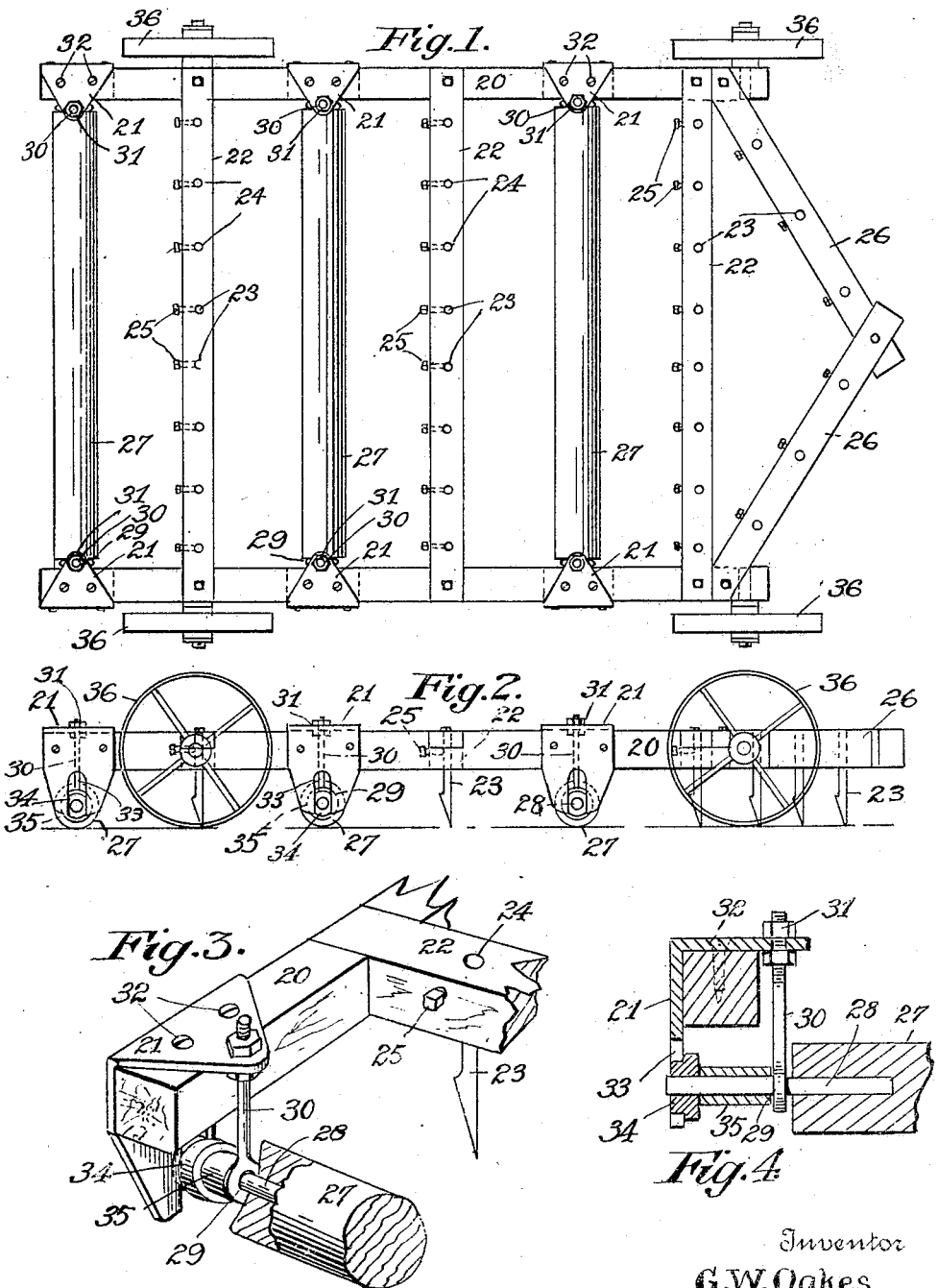

GEORGE W. OAKES, OF ROSELAND, NEW JERSEY.

SOIL-PULVERIZER.

1,374,465.  Specification of Letters Patent.  Patented Apr. 12, 1921.

Application filed May 17, 1920. Serial No. 381,836.

*To all whom it may concern:*

Be it known that I, GEORGE W. OAKES, a citizen of the United States, residing at Roseland, in the county of Essex and State of New Jersey, have invented certain new and useful Improvements in Soil-Pulverizers of which the following is a specification.

This invention has reference to an implement for tilling the soil, especially for treating the ground after it has been stirred up by implements such as a plow or a digging fork or spade, when it is desired to break up the lumps into fine particles and level off the unevenness, and set the soil without causing it to pack.

The object of the present invention is to provide an improved form of implement for pulverizing the soil in which a series of comparatively small rollers are carried between a series of cross bars provided with ordinary harrow teeth, which will serve to break up the lumps of the plowed ground and to set the soil and level it without the objectionable feature of causing the soil to pack or harden.

A further object of the invention is to provide means for readily adjusting the roller relative to the teeth of the bars, in regard to its height.

In the accompanying drawing showing one embodiment of my invention, Figure 1 is a plan view of the device.

Fig. 2 is a side elevation of the same.

Fig. 3 shows enlarged the means for adjusting the rollers.

Fig. 4 is a partial section through one end of a roller and its adjusting means.

As shown in the drawing the device or implement comprises a frame, having side bars 20, 20, to which are suitably secured cross bars 22 that connect the side bars. Each of the cross bars is provided with a set of teeth 23, mounted in holes 24 and projecting downwardly, similar to the usual harrow teeth. The position of these teeth may be adjusted by clamping bolts 25, to vary their height. At the front a pair of bars 26, 26 are shown extending forward that may be used to draw the device along the ground. These bars may also be provided with the teeth 23 if desired. I also provide a series of rollers 27 extending transversely between the side bars 20, whose ends are journaled in suitable bearings on the side bars. These rollers are preferably arranged between the cross bars, one placed to the rear of each cross bar, as shown. Each roller has a journal 28 at each end, which rotates in the aperture ends 29 of adjusting bolts 30. The latter pass through angle plates 21 secured to the side bars 20 by screws 32, the bolts having nuts 31 to engage the opposite faces of the angle plate, and lock the bolts in adjusted positions. The journals 28 are each provided with a flanged collar 34 at the end engaging the walls of slots 33 in the lower portion of the angle plate 21; and a spacing sleeve 35 is placed on the journal between the collar 34 and the supporting bolt 30, see Fig. 9. It will be understood that the collars 34 can slide vertically in the slots 33 in the angle plate, when the bolts 30 are adjusted by their nuts 31. But the collars engaging the side walls of the slot will prevent horizontal movement of the journals and take such strain off of the bolts 30.

The device may further be provided with a wheel 36 at each of the four corners suitably pivoted in the side bars 20; that will sustain part of the weight of the cultivator and prevent its going too deeply into the ground.

The front teeth 23 in the bars 26 also serve to level the ground and make it smooth for the rollers.

It will be understood that this implement will act as a harrow or cultivator, and will break up the lumps and pulverize the soil; while the rollers will tend to level the soil and also break up small lumps, but without the injurious effect of packing the soil.

What I claim is:—

1. In a harrow, a pair of side bars, a series of cross bars secured to the side bars, each crossbar having a series of teeth, a set of rollers one mounted between each of the crossbars, each roller being provided with an adjustable bearing whereby it is independently and rigidly secured directly to the crossbar.

2. In a harrow, a pair of side bars, a series of cross bars secured to the side bars, each crossbar having a series of teeth, a set of rollers one mounted between each of the crossbars, each roller being provided with an adjustable bearing whereby it is independently and rigidly secured directly to the crossbar, said bearing comprising a journal on each roller, an eye-bolt engaging said journal, and an apertured plate on the side bar in which said bolt is adjustably secured by nuts.

3. In a harrow, a pair of side bars, a series of cross bars secured to the side bars, each crossbar having a series of teeth, a set of rollers one mounted between each of the crossbars, each roller being provided with an adjustable bearing whereby it is independently and rigidly secured directly to the crossbar, said bearing comprising a journal on each roller, an eye-bolt engaging said journal, an apertured plate on the side bar in which said bolt is adjustably secured by nuts, said plate having a top portion and a side portion containing a slot in which said journal projects, a flanged washer on the journal projecting into said slot to guide the journal, and a sleeve on the journal between the washer and the eye-bolt.

Signed—at Roseland, New Jersey, on May 7th, 1920.

GEORGE W. OAKES.